(12) United States Patent
Ferlin

(10) Patent No.: US 7,926,529 B2
(45) Date of Patent: Apr. 19, 2011

(54) TIRE FOR HEAVY EQUIPMENT AND TIRE TREAD

(75) Inventor: Oliver Ferlin, Malauzat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 727 days.

(21) Appl. No.: 11/391,233

(22) Filed: Mar. 29, 2006

(65) Prior Publication Data

US 2006/0174988 A1 Aug. 10, 2006

Related U.S. Application Data

(63) Continuation of application No. PCT/EP2004/010915, filed on Sep. 30, 2004.

(30) Foreign Application Priority Data

Sep. 30, 2003 (FR) ...................................... 03 11467

(51) Int. Cl.
*B60C 1/00* (2006.01)
*B60C 11/00* (2006.01)

(52) U.S. Cl. ................. 152/209.7; 428/314.8; 428/318.8

(58) Field of Classification Search ............... 152/209.5, 152/209.7; 428/314.8, 318.8
See application file for complete search history.

(56) References Cited

U.S. PATENT DOCUMENTS

| 4,446,902 | A | * | 5/1984 | Madec et al. | ............ 152/209.12 |
| 5,181,976 | A | | 1/1993 | Iwafune et al. | |
| 5,571,350 | A | | 11/1996 | Teratani et al. | |
| 6,135,180 | A | | 10/2000 | Nohara | |
| 2001/0054776 | A1 | | 12/2001 | Bon | |
| 2003/0089438 | A1 | * | 5/2003 | Sandstrom et al. | ........ 152/209.1 |
| 2004/0084122 | A1 | | 5/2004 | Bon | |
| 2005/0103415 | A1 | * | 5/2005 | Lukich et al. | ............ 152/209.12 |

FOREIGN PATENT DOCUMENTS

| JP | 08-324209 | * | 12/1996 |
| WO | WO 02/40581 | * | 5/2002 |

OTHER PUBLICATIONS

HCM Holding Rubber Foam, www.hcmchina.cn, three pages, date 2009.*

* cited by examiner

*Primary Examiner* — Steven D Maki
(74) *Attorney, Agent, or Firm* — Buchanan Ingersoll & Rooney PC

(57) ABSTRACT

A tire for heavy equipment of the heavy-vehicle, agricultural or construction machinery type, includes a carcass reinforcement surmounted radially by a crown reinforcement, itself covered radially by a tread, the tread being connected to two beads by two sidewalls. The tread is formed, at least in its radially outward part, of an expanded elastomer mix whose specific gravity is less than 02.

6 Claims, No Drawings

US 7,926,529 B2

TIRE FOR HEAVY EQUIPMENT AND TIRE TREAD

This application is a continuation of International Application
PCT/EP2004/010915 filed on Sep. 30, 2004, and designating the U.S.

BACKGROUND

The present invention concerns a tire or equivalent system, intended for fitting on heavy equipment of the heavy-vehicle, agricultural, or construction machinery type, the said tire comprising at least one carcass reinforcement surmounted radially by a tread.

Such tires consist of a carcass reinforcement usually surmounted radially by a crown reinforcement, itself covered radially by a tread, the said tread being connected to two tire beads by means of two sidewalls.

It is found that the use of such vehicles, particularly in the case of agricultural applications, leads to the crushing of crops. Contact between the vehicle and the ground takes place via the tire's contact area with the soil; the pressure exerted by the load and the tangential forces that result from the transmission of the braking and drive torques and lateral forces related to the dynamics of the vehicle can in effect damage the soil by compacting it, ploughing it up, or friction.

What users now want is to reduce the risk of damaging crops during use on farmlands due to the crushing of the crops as the vehicle, and more specifically its tires, pass over them.

To reduce soil crushing, it is known to reduce the pressure of the tires and/or increase their dimensions so as to reduce the pressure against the ground and therefore the crushing. In this way ground pressures lower than 1 bar can be obtained.

At this pressure level the structural rigidity of the tire is no longer negligible compared with its pneumatic rigidity, and because of this the distribution of pressures on the ground is not uniform; the shoulders of the tire carry more than its tread. This phenomenon of non-homogeneous pressure distribution over the contact area is accentuated if the ground has surface irregularities.

Until now, the numerous investigations by the applicant relating to modifications of meridian profiles of the tread, meridian profiles of the carcass reinforcement, materials for the carcass reinforcement and the crown, or modifications of the design and size of tread pattern blocks, have not brought the improvements hoped for.

It is also known to use paired tires, which can enable the crushing to be limited by reducing the pressure of each tire while preserving the load capacity. Such solutions, however, lead in particular to problems of bulkiness.

It is also known to use caterpillar tracks, which enable the average pressure exerted on the ground by the vehicle to be reduced still further.

Solutions of this type can allow the load to be distributed over a larger contact area and so to reduce the pressure exerted on the ground. In contrast, in the case of ground that has surface irregularities such that contact can only take place at a few high-points, an ordinary tire or caterpillar track leads to local excess pressures because of the said points.

A purpose of the invention is thus to provide tires or equivalent systems for heavy equipment which, in particular, cause less damage to the ground, particularly due to compacting or crushing as the equipment passes over it, whatever the nature of the ground and especially in the case of loose soil or ground with surface irregularities.

SUMMARY OF INVENTION

The equipment tire according to the invention comprises a carcass reinforcement surmounted radially by a crown reinforcement, itself covered radially by a tread, the said tread being connected to two beads by sidewalls, the said tread consisting, at least in its radially outer part, of an expanded elastomer mix whose specific gravity is less than 0.2 and preferably close to 0.1.

"Axial" is understood to mean a direction parallel to the rotation axis of the tire; that direction can be "axially inward" when it is directed towards the inside of the tire and "axially outward" when it is directed towards the outside of the tire.

"Radial" means a direction perpendicular to the rotation axis of the tire and passing through the rotation axis. That direction can be "radially inward" or "radially outward" depending on whether it is directed towards the rotation axis or towards the outside of the tire.

The rotation axis of the tire is the axis about which it turns during normal use.

The circumferential or longitudinal direction of the tire is the direction corresponding to the periphery of the tire and defined by the rolling direction of the tire. At all points it is perpendicular to the radial and axial directions.

A radial or meridian plane is a plane containing the rotation axis of the tire.

A circumferential plane is a plane perpendicular to the rotation axis of the tire.

The median circumferential plane or equatorial plane is a plane perpendicular to the rotation axis of the tire and which divides the tire into two halves.

The tire so defined according to the invention enables a substantial improvement of the distribution of the pressure exerted on the ground at the level of the tire's footprint on the ground.

In a preferred embodiment of the tire, the Shore 00 hardness of the expanded elastomer mix is lower than 60 and preferably lower than 55.

The Shore 00 hardness is measured in accordance with the standard ASTM D 2240.

It is also preferable for the expanded elastomer mix to be a foam with closed cells.

DETAILED DESCRIPTION OF PREFERRED EMBODIMENTS

The tire according to the invention so defined has characteristics such that, on ground with surface irregularities, the tread of the said tire is deformed around the obstacle or irregularity and this deformation is localized and limited within the tread itself. In other words, the very much lower rigidity of the tread compared with that of the tire's structure allows very localized deformation due to irregularity of the ground. Thus, such a structure makes it possible to preserve a satisfactorily homogeneous distribution of the load exerted at the level of the footprint on the ground, without the occurrence of excessive overload peaks. Furthermore, the tire so defined and more specifically its tread deforms to an acceptable extent when prestressed by the load applied to the wheel.

In a particularly advantageous embodiment of the invention, the expanded elastomer mix is a butyl. Such a material is described for example in European patent application EP 1 149 678.

In an advantageous variant of the invention, the radially outward part of the tread is covered by a protective film. Such a protective film is for example a film of the non-expanded butyl type. The protective function sought relates essentially to soil aggressions; accordingly, it is advantageous to choose a material of greater cohesion, in particular one which resists tearing. The protective film can also be chosen advantageously to confer other kinds of protection, for example against solar radiation or even against chemical aggressions.

In a preferred embodiment of the invention, the radially outward part of the tread is firmly attached to the radially inward layer directly in contact with it. In particular, this result can be obtained by bonding the tread to a basis structure of the said tire. The basis structure of the tire is for example a tire made previously with no tread, or at least without the radially outward part of the tread.

The results of tests carried out have shown that the use of a tire as defined according to the invention reduces the risks of damage to crops when rolling over fields, in particular because of the better pressure distribution at the level of the ground contact area.

The invention also proposes a tread for heavy equipment consisting, at least in its radially outward part, of an expanded elastomer mix whose specific gravity is less than 0.2 and advantageously close to 0.1.

Advantageously, the Shore 00 hardness of the expanded elastomer mix is lower than 60 and preferably lower than 55.

As mentioned earlier, the expanded elastomer mix is a foam with closed cells, for example a butyl.

It is also advantageous for the radially outward part of the tread to be covered with a protective film.

The invention also proposes the use of a tread as defined above to produce a means for assisting movement, such as a tire or a caterpillar track.

In a first embodiment, the said tread is fixed by any means familiar to those with knowledge of the subject, such as an adhesive, to a basis structure of the said movement assisting means.

In a second embodiment, the said tread is associated in a non-permanent way with a basis structure of the said movement assisting means. In such an embodiment the tread can be used in the form of a sleeve or sock which is only put in place in case of need. As regards the fitting, such an embodiment can be likened to the chains provided for driving on snow in the case of passenger cars.

Such an embodiment can be used both with tires and with caterpillar tracks, the tread then covering a tread of the tire that can be used without the said tread according to the invention.

These embodiments according to the invention are more particularly suitable for basis structures of movement assisting means whose structural rigidity is low.

More particularly still, a tread according to the invention is provided for creating a movement assisting means intended for a heavy vehicle in which the inflation pressure of the said movement assisting means is lower than 0.3 b.

Other details and advantageous characteristics of the invention will emerge from the description of the tests carried out and described below.

The tests carried out were of to types. Firstly, vehicles were driven over ground in which were embedded flat sensors to measure the pressure exerted by the tire on the ground. Then, other tests consisted in simulating ground with irregularities and measuring the load exerted by the tire on such an irregularity.

The vehicles used in the tests have tires of size 710/70 R 34 inflated to 0.2 b. The tires are made according to the invention and comprise a tread having, radially on the outside, a layer 40 mm thick made of expanded butyl of a specific gravity equal to 0.1 and a Shore 00 hardness equal to 49.

The tests were also carried out with reference vehicles fitted with tires of the same size and inflated to the same pressure, but having an ordinary tread.

The radial load applied on each tire was 1600 kg.

The first test then consisted in driving the vehicles over a flat sensor and measuring the pressure exerted on it.

In the case of the reference vehicle, excess pressures appeared at the level of the tire's shoulders compared with the middle of the tread; this excess pressure at the shoulders is about 3 times the pressure in the middle. These results confirm that at the inflation pressures in question the structural rigidity of the tire is a non-negligible factor.

The results obtained with the tires according to the invention showed that the pressure remained lower than 0.4 b across the full axial width of the tread, this being entirely satisfactory for the applications envisaged.

The second tests were carried out by driving the vehicles over circular sensors, of the stud type, with a height of 30 mm.

In the case of the tires on the reference vehicle, the sensors detected a mass that ranged from 200 to 350 kg depending on whether they were located at the middle of the tread or at the level of its shoulders.

In the case of the tires according to the invention, the load measured by the sensors was less than 80 kg over the entire axial width of the tread.

The tread of a tire or movement assisting means as defined according to the invention produces better homogeneity of the pressure in the contact area zone and reduces the risks of local pressure increase when there are irregularities on the ground, so enabling vehicles to be used with less risk of ground degradation, in particular by crushing.

The invention claimed is:

1. Tire for heavy equipment of the heavy-vehicle, agricultural or construction machinery type, comprising a carcass reinforcement surmounted radially by a crown reinforcement, itself covered radially by a tread, the tread being connected to two beads by two sidewalls, wherein the tread consists, at least in its radially outward part, of an expanded elastomer mix with a specific gravity less than 0.2, wherein the Shore 00 hardness of the expanded elastomer mix is lower than 60, and the part formed of the elastomer mix is 40 mm thick.

2. Tire according to claim 1, wherein the expanded elastomer mix is a foam with closed cells.

3. Tire according to claim 1, wherein the expanded elastomer mix is a butyl.

4. Tire according to claim 1, wherein the radially outward part of the tread is covered by a protective film.

5. Tire according to claim 1, wherein the radially outward part of the tread is firmly attached to a radially inward layer of the tread with which it is directly in contact.

6. Tire according to claim 1, wherein the part formed of expanded elastomer mix is a removable part that is removable from the tire.

* * * * *